(12) United States Patent
Jordan, III et al.

(10) Patent No.: US 8,156,485 B2
(45) Date of Patent: Apr. 10, 2012

(54) METHOD AND APPARATUS FOR CREATING A PLUGGABLE, PRIORITIZED CONFIGURATION ENGINE TO BE USED FOR CONFIGURING A SOFTWARE DURING INSTALLATION, UPDATE AND NEW PROFILE CREATION

(75) Inventors: Robert Lee Jordan, III, Apex, NC (US); Rohit V. Kapoor, Richmond Hill (CA)

(73) Assignee: Google Inc., Mountain View, CA (US)

( * ) Notice: Subject to any disclaimer, the term of this patent is extended or adjusted under 35 U.S.C. 154(b) by 1353 days.

(21) Appl. No.: 11/003,258

(22) Filed: Dec. 3, 2004

(65) Prior Publication Data

US 2006/0123409 A1 Jun. 8, 2006

(51) Int. Cl.
*G06F 9/445* (2006.01)

(52) U.S. Cl. ......... 717/168; 717/169; 717/175; 717/178

(58) Field of Classification Search ................. 717/175
See application file for complete search history.

(56) References Cited

U.S. PATENT DOCUMENTS

| | | | | |
|---|---|---|---|---|
| 6,006,035 | A * | 12/1999 | Nabahi | 717/175 |
| 6,301,708 | B1 * | 10/2001 | Gazdik et al. | 717/175 |
| 6,601,233 | B1 | 7/2003 | Underwood | |
| 6,675,382 | B1 * | 1/2004 | Foster | 717/177 |
| 6,698,018 | B1 * | 2/2004 | Zimniewicz et al. | 717/175 |
| 6,738,970 | B1 * | 5/2004 | Kruger et al. | 717/175 |
| 7,146,609 | B2 * | 12/2006 | Thurston et al. | 717/169 |
| 7,475,396 | B2 * | 1/2009 | Kapoor | 717/178 |
| 7,584,471 | B2 * | 9/2009 | Bjare et al. | 717/178 |
| 2002/0010910 | A1 * | 1/2002 | Crudele et al. | 717/4 |
| 2002/0116477 | A1 | 8/2002 | Somashekar et al. | |
| 2002/0147974 | A1 * | 10/2002 | Wookey | 717/176 |
| 2002/0178227 | A1 | 11/2002 | Matsa et al. | |
| 2003/0204791 | A1 | 10/2003 | Helgren et al. | |
| 2004/0060045 | A1 * | 3/2004 | Hind et al. | 717/174 |
| 2004/0073890 | A1 | 4/2004 | Johnson et al. | |
| 2004/0181787 | A1 * | 9/2004 | Wickham et al. | 717/168 |
| 2004/0250247 | A1 * | 12/2004 | Deeths et al. | 717/175 |
| 2006/0271926 | A1 * | 11/2006 | Hutton et al. | 717/168 |

(Continued)

FOREIGN PATENT DOCUMENTS

WO    WO 01/18648    3/2001

OTHER PUBLICATIONS

Joan et al., A meta-model for intelligent adaptive multi-agent systems in open environments, Jul. 2003, pp. 1024-1025, <http://delivery.acm.org/10.1145/870000/860777/p1024-juan.pdf>.*

(Continued)

*Primary Examiner* — Thuy Dao
(74) *Attorney, Agent, or Firm* — Young, Basile, Hanlon & MacFarlane P.C.

(57) ABSTRACT

One or more pluggable install components may be used with a modular install configuration engine. Each install component carries instructions that allow an install components to be used with the configuration engine. Each install component also carries payload files for deployment onto a user's end system. Each install component may be created and updated by a plurality of vendors or programming groups. Upon installation, the install component and the modular install configuration engine are integrated to create a unique install program tailored to the needs of a particular customer.

8 Claims, 14 Drawing Sheets

U.S. PATENT DOCUMENTS

2007/0061799 A1* 3/2007 Kimmerly .................. 717/168
2007/0233500 A1* 10/2007 Skunberg et al. ............. 705/1
2008/0201705 A1* 8/2008 Wookey .................... 717/175

OTHER PUBLICATIONS

Gomez-sanz et al., Meta-models for building multi-agent systems, Mar. 2002, pp. 37-41, <http://delivery.acm.org/10.1145/510000/508801/p37-gomez-sanz.pdf>.*

O'Ryan et al., The design and performance of a pluggable protocols framework for real-time distributed object computing middleware, Apr. 2000, pp. 372-393, <http://delivery.acm.org/10.1145/340000/338384/p372-o_ryan.pdf>.*

Kapoor, Method and Apparatus for Defining, Building and Deploying Pluggable and Independently Configurable Install Components, filed Dec. 3, 2004.

U.S. Appl. No. 10/963,138, Draper, A Solution for a Computer System, filed Oct. 12, 2004.

U.S. Appl. No. 10/904,436, Draper, Describing Runtime Components of a Solution for a Computer System, filed Nov. 10, 2004.

* cited by examiner

FIG. 7a

```xml
<componentfiles componentName="install">
    <file>
        <relativepath>properties/version/install.component</relativepath>
        <md5checksum> </md5checksum>
        <installoperation>add</installoperation>
    </file:>
    <file:>

<relativepath>properties/version/install/6.0.0.0/config/full/install/05FBo
otStrapSetUpCmdLine.ant</relativepath>
        <md5checksum> </md5checksum>
        <installoperation>add</installoperation>
    </file>
    <file>

<relativepath>properties/version/install/6.0.0.0/config/full/uninstall/06S
uninstallCleanUp.ant</relativepath>
        <md5checksum> </md5checksum>
        <installoperation>add</installoperation>
    </file>
    <file>
        <relativepath>properties/was.license</relativepath>
        <md5checksum> </md5checksum>
        <installoperation>add</installoperation>
    </file>
    <file>
        <relativepath>temp/.CreateDirDummy</relativepath>
        <md5checksum> </md5checksum>
        <installoperation>add</installoperation>
    </file>
    <file>
        <relativepath>tmp/.CreateDirDummy</relativepath>
        <md5checksum> </md5checksum>
        <installoperation>add</installoperation>
    </file>
    <file>
        <relativepath>bin/setupCmdLine.sh</relativepath>
        <md5checksum> </md5checksum>
        <installoperation>add</installoperation>
    </file>
    <file>
        <relativepath>bin/uninstallCleanup.sh</relativepath>
        <md5checksum> </md5Checksum>
        <installoperation>add</installoperation>
    </file>
```

FIG. 7b

```xml
<file>
    <relativepath>bin/pre_uninst5Ows.sh</relativepath>
    <md5checksum></md5checksum>
    <installoperation>add</installoperation>
</file>
<file>
    <relativepath>bin/post_uninst5Ows.sh</relativepath>
    <md5checksum></md5checksum>
    <installoperation>add</installoperation>
</file>
<file>
    <relativepath>bin/icons/aat.ico</relativepath>
    <md5checksum></md5checksum>
    <installoperation>add</installoperation>
</file>
<file>
    <relativepath>bin/icons/console.ico</relativepath>
    <md5checksum></md5checksum>
    <installoperation>add</installoperation>
</file>
<file>
    <relativepath>bin/icons/firststeps.ico/relativepath>
    <md5checksum></md5checksum>
    <installoperation>add</installoperation>
</file>
<file>
    <relativepath>bin/icons/infocenter.ico</relativepath>
    <md5checksum></md5checksum>
    <installoperation>add</installoperation>
</file>
<file>
    <relativepath>bin/icons/samples.ico</relativepath>
    <md5checksum></md5checksum>
    <installoperation>add</installoperation>
</file>
<file>
    <relativepath>bin/ icons/server_stopped. ico</relativepath>
    <md5checksum></md5checksum>
    <installoperation>add</installoperation>
</file>
<file>
    <relativepath>bin/icons/start_server.ico</relativepath>
    <md5checksum></md5checksum>
    <installoperation>add</installoperation>
</file>
```

```
        <file>
                <relativepath>bin/icons/PerfMonitor.ico</relativepath>
                <md5checksum><md5checksum>
                < installoperation>add</installoperation>
        </file>
</componentfiles>
```

*FIG. 7c*

```
package com.ibm.ws.install.configmanager.tests;

import com.ibm.ws.install.configmanager.ijc.IJC;
import com.ibm.ws.install.configmanager.launcher.ArgumentValueFetcher;

class TestDynamicIJCAction
      implements IJC
{ public TestDynamicIJCAction()
      {
              return;
      } public boolean execute()
      {
              System.out.println ("TestDynamicIJCAction called, the current repository
location is: " +
                      ArgumentValueFetcher.getArgumentValue( "WS_CMT_CONF_DIR" ) ) ;
              return true;
      }
}
```

*FIG. 8*

```xml
<project name= "bootstrapWCCMFiles" default= "bootstrapWCCMFiles" basedir="." >

<taskdef name="wscmtlog"
classname="com.ibm.ws.install.configmanager.actionengine.ant.utils.AntTaskToLogToConfigManagersLogFiles"/>
    <taskdef name="replaceStringRegExp"
classname="com.ibm.ws.install.configmanager.actionengine.ant.utils.ReplaceStringRegExpAntTask"/>

<property name="NODE_NAME" value="${WS_CMT_NODE_NAME}"/>
    <property name="CELL_NAME" value="${WS_CMT_CELL_NAME}"/>

<target name="detectCurrentOSFamily"
            description="Detects the current OS family (UNIX or Windows) ">

<condition property="currentOSFamily" value="windows">
            <os family="windows"/>
        </condition>

<condition property="currentOSFamily" value="unix" >
            <os family="unix"/>
        </condition>

<wscmtlog>Detected current OS family to be:
$ {currentOSFamily}</wscmtlog>
    </target>

<target name="setCurrentOSFamily"
            description="Detecs the current OS family (UNIX or Windows) ">

<condition property="isCurrentOSWindows" value="true">
            <os family="windows"/>
        </condition>

<condition property="isCurrentOSUNIX" value="true">
            <os family="unix"/>
        </condition>
    </target>
```

```xml
<target name="setHostNameproperty"
        description="Resolves the hostname property">

<property name="hostname" value="${WS_CMT_HOST_NAME}"/>

<wscmtlog>Hostname resolved to: ${hostname}</wscmtlog>
</target>

<target name="setOSFileSeparator"
        description="Sets the current file separator for this platform
(file.separator is unreliable on ANT 1.5.4) ">

<condition property="separatorFile" value="/">
        <equals arg1="${currentOSFamily}" arg2="unix"/>
    </condition>

<condition property="separatorFile" value="\ ">
        <equals arg1="${currentOSFamily}" arg2="windows"/>
    </condition>
</target>

<target name="renameCellDirectoryToMatchCellName">
    <move toDir="${WAS_HOME}/config/cells/${CELL_NAME}">
        <fileset dir="${WAS_HOME}/config/cells/BaseApplicationServerCell"/>
    </move>
</target>

<target name="renameNodeDirectoryToMatchNodeName">
    <move toDir="${WAS_HOME}/config/cells/${CELL_NAME}/nodes/${NODE_NAME}">
        <fileset dir="${WAS_HOME}/config/cells/${CELL_NAME}/nodes/DefaultNode"/>
    </move>
</target>

<target name="resolveSetupCmdLineName">
    <available property="setupCmdLineName"
        value="setupCmdLine.bat"
        file="${WAS_HOME}/bin/setupCmdLine.bat"/>

<available property="setupCmdLineName"
        value="setupCmdLine.sh"
        file="${WAS_HOME}/bin/setupCmdLine.sh"/>

<wscmtlog>Detected setupCmdLine script name to be:
${setupCmdLineName}</wscmtlog>
</target>
```

```xml
<target name="resolveWASHomeForOSShellScripts"
        description="Sets the property WAS_HOME_FOR_OS_SHELL_SCRIPTS with the slash characters set according to the current OS, so that the shell scripts work properly">

<path id="was.home.id">
        <pathelement location="${WAS_HOME}"/>
    </path>

<pathconvert targetos="${currentOSFamily}"
            property="WAS_HOME_FOR_OS_SHELL_SCRIPTS"
            refid="was.home.id"/>

<wscmtlog>WAS_HOME for shell scripts was resolved to be: ${WAS_HOME_FOR_OS_SHELL_SCRIPTS}</wscmtlog>
</target>

<target name="resolveWASHomeForPropertyFiles"
        description="Sets the property WAS_HOME_FOR_PROPERTY_FILES with slash characters etc. adjusted for property files">

<replaceStringRegExp string="${WAS_HOME}"
            regexp="\\"
            value="/"
            property="WAS_HOME_FOR_PROPERTY_FILES_FIRST_PASS"/>

<replaceStringRegExp string="${WAS_HOME_FOR_PROPERTY_FILES_FIRST_PASS}"
            regexp="/:"
            value="\ : /"
            property="WAS_HOME_FOR_PROPERTY_FILES"/>

<wscmtlog>WAS_HOME for property files was resolved to be: ${WAS_HOME_FOR_PROPERTY_FILES}</wscmtlog>
</target>

<target name="replaceAllInstancesOfGivenTokenWithGivenValueForTheGivenFile">
    <wscmtlog>Replacing token: ${token}, with ${tokenValue}, in file ${file}</wscmtlog>

<replace file="${file}"
            token="${token}"
            value="${tokenValue}"/>
</target>
```

*FIG. 9c*

```xml
<target name="appendToGivenFileGivenString">
        <echo file="${file}"
              message="${stringToAppend}"
              append="true"/>
    </target>

<target name="replaceAllNecessaryTokensWithRightValuesForAllWCCMFiles">

<antcall
target="replaceAllInstancesOfGivenTokenWithGivenValueForTheGivenFile">
                <param name="file"
value="${WAS_HOME}/config/cells/${CELL_NAME}/nodes/${NODE_NAME}/variables.xml"/>
                <param name="token" value="$$(was.install.root)"/>
                <param name="tokenValue" value="${WAS_HOME}"/>
        </antcall>

<antcall
target="replaceAllInstancesOfGivenTokenWithGivenValueForTheGivenFile">
                <param name="file"
value="${WAS_HOME}/config/cells/${CELL_NAME}/nodes/${NODE_NAME}/variables.xml"/>
                <param name="token" value="$$ (java.install.root)"/>
                <param name="tokenValue" value="${WAS_HOME)/java"/>
        </antcall>

<antcall
target="replaceAllInstancesOfGivenTokenWithGivenValueForTheGivenFile" >
                <param name="file"
value="${WAS_HOME}/config/cells/${CELL_NAME}/nodes/${NODE_NAME}/variables.xml"/>
                <param name="token" value="$$(node.name)"/>
                <param name="tokenValue" value="${NODE_NAME}"/>
        </antcall>

<antcall
target="replaceAllInstancesOfGivenTokenWithGivenValueForTheGivenFile">
                <param name="file"
value="${WAS_HOME}/config/cells/${CELL_NAME}/nodes/${NODE_NAME}/variables.xml"/>
                <param name="token" value="$$(mq.install.root)"/>
                <param name="tokenValue" value=" "/>
        </antcall>
```

*FIG. 9d*

```xml
<antcall
target="replaceAllInstancesOfGivenTokenWithGivenValueForTheGivenFile">
        <param name="file"
value="${WAS_HOME}/config/cells/${CELL_NAME}/nodes/${NODE_NAME}/variables.xml"/>
        <param name="token" value="$$(pubsub.install.root}"/>
        <param name="tokenValue" value=" "/>
</antcall>

<antcall
target="replaceAllInstancesOfGivenTokenWithGivenValueForTheGivenFile">
        <param name="file"
value="${WAS_HOME}/config/cells/${CELL_NAME}/nodes/${NODE_NAME}/serverindex.xml"/>
        <param name="token" value="$$(node.host.name)"/>
        <param name="tokenValue" value="${hostname}"/>
</antcall>

<antcall
target="replaceAllInstancesOfGivenTokenWithGivenValueForTheGivenFile" >
        <param name="file"
value="${WAS_HOME}/config/cells/${CELL_NAME}/nodes/$(NODE_NAME}/node.xml"/>
        <param name="token" value="$$(node.name)"/>
        <param name="tokenValue" value="${NODE_NAME}"/>
</antcall>

<antcall
target="replaceAllInstancesOfGivenTokenWithGivenValueForTheGivenFile">
        <param name="file"
value="${WAS_HOME}/config/cells/${CELL_NAME}/cell.xml"/>
        <param name="token" value="$$(cell.name)"/>
        <param name="tokenValue" value="${CELL_NAME}"/>
</antcall>

<antcall
target="replaceAllInstancesOfGivenTokenWithGivenValueForTheGivenFile">
        <param name="file"
value="${WAS_HOME}/config/cells/${CELL_NAME}/nodes/${NODE_NAME}/servers/server1/server.xml"/>
        <param name="token" value="$$(node.name)"/>
        <param name="tokenValue" value="${NODE_NAME}"/>
</antcall>
```

*FIG. 9e*

```xml
<antcall
target="replaceAllInstancesOfGivenTokenWithGivenValueForTheGivenFile">
    <param name="file"
value="${WAS_HOME}/config/templates/servertypes/APPLICATION_SERVER/servers/default/server.xml"/>
    <param name="token" value="$$(node.name)"/>
    <param name="tokenValue" value="${NODE_NAME}"/>
</antcall>

<antcall
target="replaceAllInstancesOfGivenTokenWithGivenValueForTheGivenFile">
    <param name="file"
value="${WAS_HOME}/config/templates/default/server-component-templates.xml"/>
    <param name="token" value="$$(node.name)"/>
    <param name="tokenValue" value="${NODE NAME}"/>
</antcall>

<antcall
target="replaceAllInstancesOfGivenTokenWithGivenValueForTheGivenFile">
    <param name="file"
value="${WAS_HOME}/config/cells/${CELL_NAME}/security.xml"/>
    <param name="token" value="$$(node.name)"/>
    <param name="tokenValue" value="${NODE_NAME}"/>
</antcall>

<antcall
target="replaceAllInstancesOfGivenTokenWithGivenValueForTheGivenFile">
    <param name="file"
value="${WAS_HOME}/properties/soap.client.props"/>
    <param name="token" value="$$(WASROOT)"/>
    <param name="tokenValue"
value="${WAS_HOME_FOR_PROPERTY_FILES}"/>
</antcall>

<antcall
target="replaceAllInstancesOfGivenTokenWithGivenValueForTheGivenFile">
    <param name="file"
value="${WAS_HOME}/properties/wsadmin.properties"/>
    <param name="token" value="$$(was.install.root)"/>
    <param name="tokenValue"
value="${WAS_HOME_FOR_PROPERTY_FILES}"/>
</antcall>
```

*FIG. 9f*

```
<antcall
target="replaceAllInstancesOfGivenTokenWithGivenValueForTheGivenFile">
            <param name="file"
value="${WAS_HOME}/bin/${setupCmdLineName}"/>
                <param name="token" value="$$(was.install.root)"/>
                <param name="tokenValue"
value="${WAS_HOME_FOR_OS_SHELL_SCRIPTS}"/>
        </antcall>

<antcall
target="replaceAllInstancesOfGivenTokenWithGivenValueForTheGivenFile">
            <param name="file"
value="${WAS_HOME}/bin/${setupCmdLineName}"/>
                <param name="token" value="$$(java.install.root)"/>
                <param name="tokenValue"
value="${WAS_HOME_FOR_OS_SHELL_SCRIPTS)${separatorFile}java"/>
        </antcall>

<antcall
target="replaceAllInstancesOfGivenTokenWithGivenValueForTheGivenFile">
            <param name="file"
value="${WAS_HOME}/bin/${setupCmdLineName}"/>
                <param name="token" value="WAS_CELL=$$(cell.name)"/>
                <param name="tokenValue" value="WAS_CELL=${CELL_NAME}"/>
        </antcall>

<antcall
target="replaceAllInstancesOfGivenTokenWithGivenValueForTheGivenFile">
            <param name="file"
value="${WAS_HOME}/bin/${setupCmdLineName}"/>
                <param name="token" value="WAS_NODE=$$ (node.na.me)"/>
                <param name="tokenValue" value="WAS_NODE=${NODE_NAME}"/>
        </antcall>
    </target>
```

*FIG. 9g*

```
<target name="bootstrapWCCMFiles"
    description="Bootstrap WCCM Files"
    depends="detectCurrentOSFamily,
        setCurrentOSFamily,
        setHostNameProperty,
        setOSFileSeparator,
        resolveWASHomeForOSShellScripts,
        resolveWASHomeForPropertyFiles,
        resolveSetupCmdLineName,
        renameCellDirectoryToMatchCellName,
        renameNodeDirectoryToMatchNodeName,
        replaceAllNecessaryTokensWithRightValuesForAllWCCMFiles"/>
</project>
```

*FIG. 9h*

METHOD AND APPARATUS FOR CREATING A PLUGGABLE, PRIORITIZED CONFIGURATION ENGINE TO BE USED FOR CONFIGURING A SOFTWARE DURING INSTALLATION, UPDATE AND NEW PROFILE CREATION

CROSS-RELATED APPLICATION

This application is related to U.S. Pat. No. 7,475,396, entitled "Method and Apparatus for Defining, Building and Deploying Pluggable and Independently Configurable Install Components."

BACKGROUND OF THE INVENTION

1. Technical Field

The present invention is related generally to a data processing system and in particular to a method and apparatus for processing data. Still more particularly, the present invention relates to a method, apparatus, and computer instructions for an install engine used to install software onto a data processing system.

2. Description of Related Art

Business software has become increasingly complex as businesses increasingly rely on computers and computer software to conduct business. For example, companies that conduct a great deal of business over a network such as the Internet require highly complex software executed on many different servers, nodes, and possibly clients to perform and track electronic transactions. Building, updating, and running complex software has become extremely burdensome due to the size and complexity of the software. An example of such software is WebSphere® Application Server provided by International Business Machines Corporation (WebSphere is a trademark of International Business Machines Corporation in the United States, other countries, or both).

Many programmers from different parts of the world may contribute to complex software, creating the potential for conflict and confusion. Programmers may be required to hunt for bugs in huge amounts of code with which they are not familiar. Different programmers may write code that conflicts with other code in the software being developed. In addition, end users may create their own code for use with the complex software. Thus, updates and installations, which are often performed on a custom basis, are increasingly difficult to perform successfully and are increasingly difficult to duplicate.

Install engines have been created that re-install complete software every time an update is needed. An install engine that provides updates as they are created has also been created.

Another system shows generates software based on business components. Logical business components in a business are defined with each business component having different capabilities. Functional interrelationships are identified between the logical business components and code modules are generated to carry out the capabilities and interrelationships of the logical business components. In another presently available system, a bundle configuration utility for configuring network pluggable components for deployment in embedded servers is used.

BRIEF SUMMARY OF THE INVENTION

Disclosed herein are embodiments of pluggable install components for use with a modular install configuration engine.

One aspect of the disclosed embodiments is a method, within a computer hardware device, for installing a file onto the computer hardware device using a modular install configuration engine, comprising: receiving a pluggable install component, said install component including a payload component containing a file to be installed onto the computer hardware device, a metadata component containing metadata instructions for how the file should be installed, and a configuration actions component containing configuration instructions for configuring the file, providing a modular install configuration engine, said modular install configuration engine being compatible with the pluggable install component and being adapted to install the file onto the computer hardware device by plugging the install component into the modular install configuration engine, interpreting the metadata of the install component using the modular install configuration engine, carrying out the metadata instructions on the file using the modular install configuration engine, carrying out the configuration instructions for configuring the file using the modular install configuration engine, installing the file onto the computer hardware device using the modular install configuration engine, and carrying out other configuration instructions from the configuration actions component before the metadata is interpreted.

Another aspect of the disclosed embodiments is a data processing system. The data processing system includes a bus, a memory operably connected to the bus, and a processor unit operably connected to the bus. The processor unit is configured to: receive a pluggable install component, the pluggable install component including a payload component containing a file to be installed onto the data processing system, a metadata component containing instructions for how the file should be installed, and a configuration actions component containing instructions for configuring the file, provide a modular install configuration engine, the modular install configuration engine being compatible with the pluggable install component and being adapted to install the file onto the data processing system by plugging the pluggable install component into the modular install configuration engine, interpret the metadata component of the install component, carry out the metadata instructions of the install component, deploy the configuration actions component of the install component such that the file of the install component may be configured, and install the file of the install component onto the data processing system, wherein other configuration actions from the configuration actions component are performed before the metadata component is interpreted.

Another aspect of the disclosed embodiments is a computer program product including a computer readable storage medium having stored therein computer readable program code for installing at least one file onto a computer hardware device. The computer readable program code, which when executed by the computer hardware device, causes the computer hardware device to perform operations of receiving a pluggable install component, said install component including a payload component containing a file to be installed onto the computer hardware device, a metadata component containing metadata instructions for how the file should be installed, and a configuration actions component containing configuration instructions for configuring the file, providing a modular install configuration engine, said modular install configuration engine being compatible with the pluggable install component and being adapted to install the file onto the computer hardware device by plugging the install component into the modular install configuration engine, interpreting the metadata of the install component using the modular install configuration engine, carrying out the metadata instructions on the file using the modular install configuration engine, carrying out the configuration instructions for configuring the file using the modular install configuration engine, installing the file onto the computer hardware device using the modular install configuration engine, and carrying out other configuration instructions from the configuration actions component before the metadata is interpreted.

These and other embodiments will be described in additional detail hereafter.

BRIEF DESCRIPTION OF THE SEVERAL VIEWS OF THE DRAWINGS

FIGS. 7a, 7b, and 7c show exemplary code for a metadata component, in accordance with an aspect of the present invention;

FIG. 8 shows exemplary code in Java for a configuration actions component, in accordance with an aspect of the present invention; and FIGS. 9a through 9h show exemplary code for a configuration actions component, in accordance with an aspect of the present invention.

DETAILED DESCRIPTION OF THE INVENTION

Figure 1:
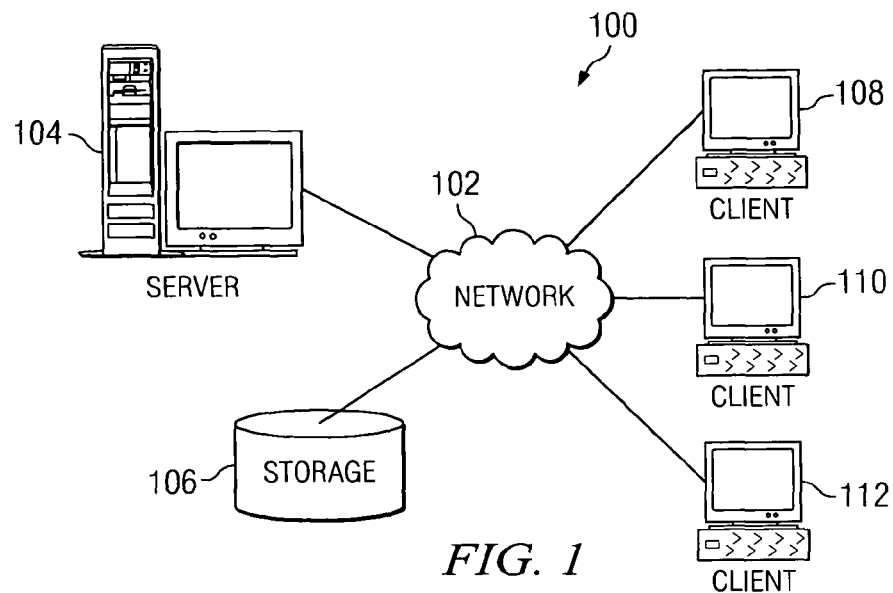
FIG. 1 is a pictorial representation of a network data processing system in which the present invention may be implemented.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects, all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to the figures and in particular with reference to FIG. 1, a pictorial representation of a network data processing system in which the present invention may be implemented is depicted. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, running system images, and programs to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
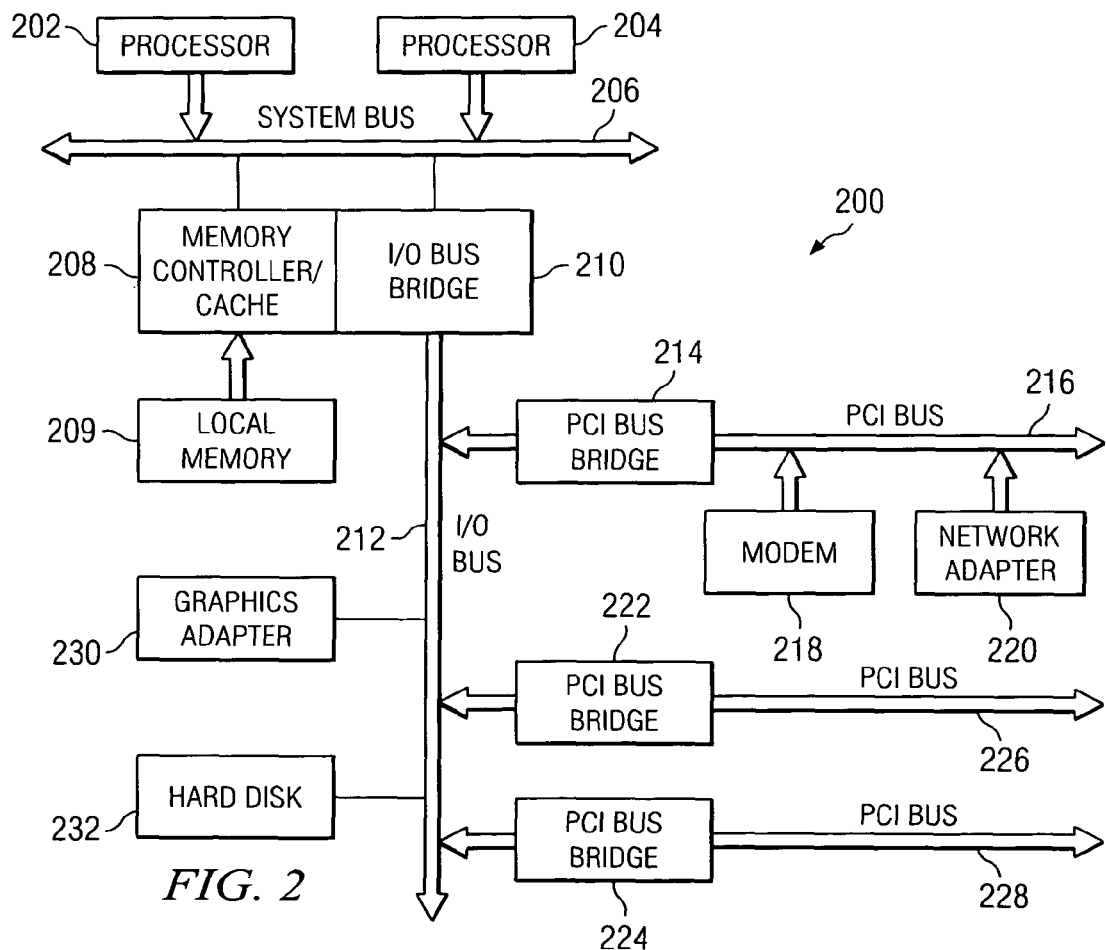
FIG. 2 is a block diagram of a data processing system that may be implemented as a server in accordance with an aspect of the present invention.

FIG. 2 is a block diagram of a data processing system that may be implemented as a server, such as server 104 of FIG. 1, in accordance with an aspect of the present invention. Data processing system 200 may be a symmetric multiprocessor (SMP) system including a number of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM (eServer® pSeries®) computer system, running the Advanced Interactive Executive (AIX) operating system or LINUX operating system (IBM, eServer, pSeries and AIX are trademarks of International Business Machines Corporation in the United States, other countries, or both while Linux is a trademark of Linus Torvalds in the United States, other countries, or both).

Figure 3:
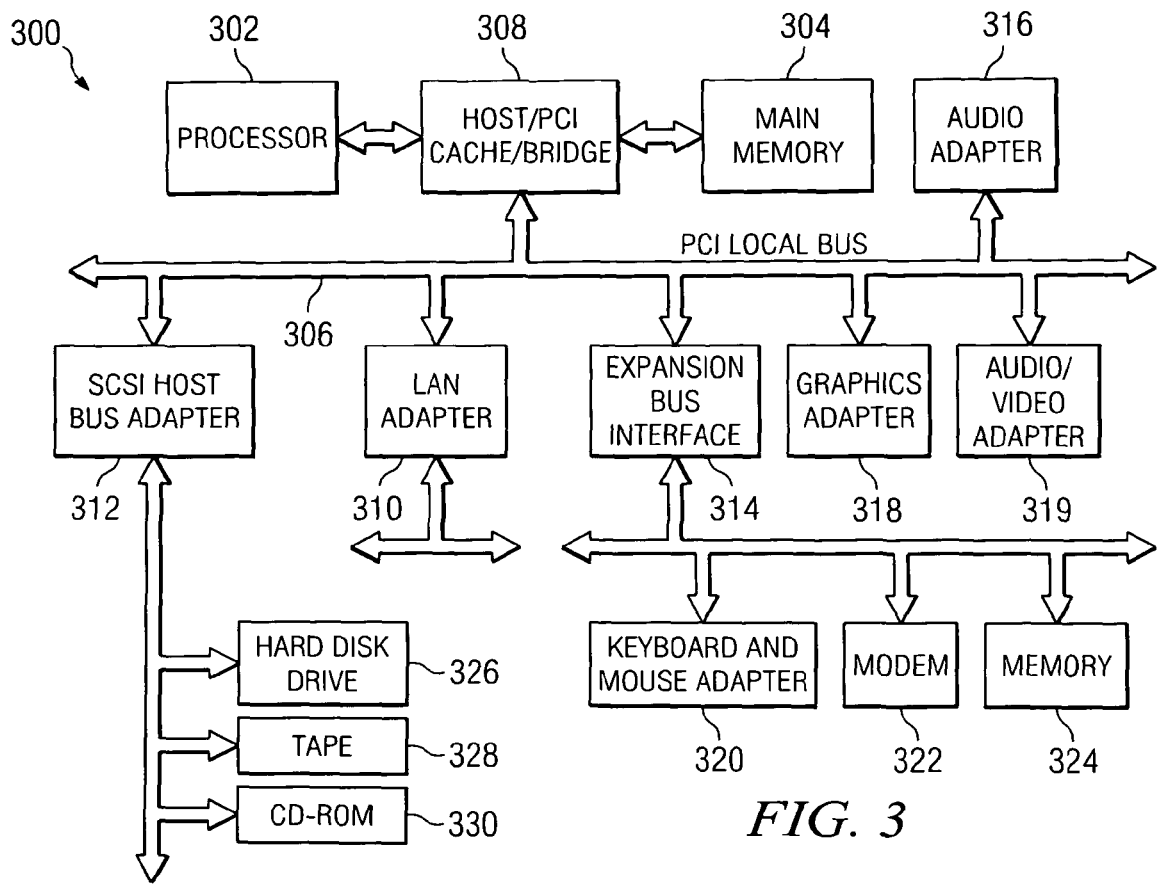
FIG. 3 is a block diagram illustrating a data processing system in which the present invention may be implemented.

FIG. 3 is a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Microsoft & Windows® XP (Microsoft and Windows are trademarks of Microsoft Corporation in the United States, other countries, or both). An object oriented programming system such as Java may run in conjunction with the operating system and provide calls to the operating system from Java® programs or programs executing on data processing system 300 (Java is a trademark of Sun Microsystems, Inc. in the United States, other countries, or both). Instructions for the operating system, the object-oriented programming system, and programs or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides for one or more pluggable install components for use with a modular install configuration engine. The modular install configuration engine draws upon instructions provided with individual install components to deliver payload files also contained within the install components. Each install component may be programmed by different vendors and the different vendors need not communicate with each other, so long as each install component is designed to work in conjunction with the modular install configuration engine. The modular install configuration engine may allow the installation of install components and payload files within the install components according to a prioritized order.

Figure 4:
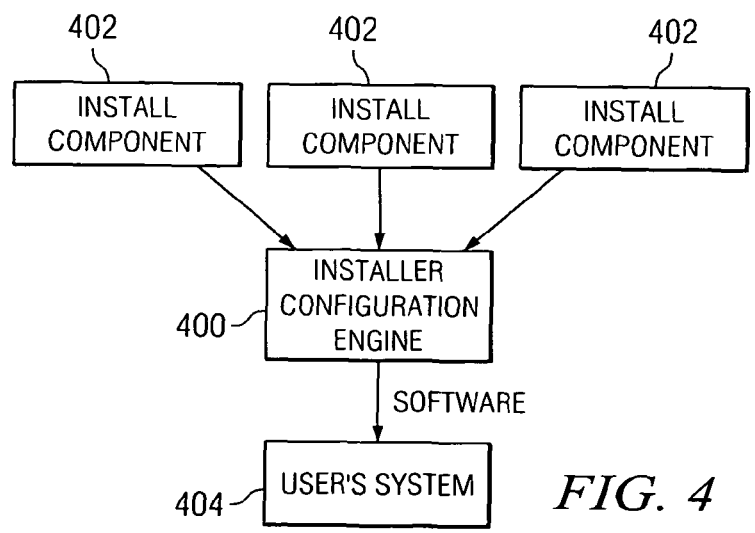
FIG. 4 is a block diagram of the operation of a modular install configuration engine in conjunction with a number of install components, in accordance with an aspect of the present invention.

FIG. 4 is a block diagram of the operation of modular install configuration engine 400 in conjunction with a number of install components 402, in accordance with an aspect of the present invention. Modular install configuration engine 400 is designed to install software onto a user's system 404, which may be, for example, server 104, individual client computers 108, 110, or 112, a combination thereof, or an individual computer. Similarly, modular install configuration engine 400 and accompanying install components 402 may be used to configure reconfigurable hardware having a complex personality. In any case, modular install configuration engine 400 may be used to install multiple software packages or personalities on the user's system according to a particular order.

Modular install configuration engine 400 is designed to install software that is complicated, highly customizable and that involves different components designed by different programmers. In an aspect of the present invention, each programmer or programming group creates one or more individual install components 402 that contain software as well as installation instructions for each particular install component 402. Modular install configuration engine 400 uses install components 402, and its own program instructions, to properly and repeatably install the complex software onto the user's system 404. Modular install configuration engine 400 and accompanying install components 402 may be used to install new software on the user's system, update existing software on the user's system, configure the software during profile creation, or perform other install-related actions on the user's system.

Figure 5:
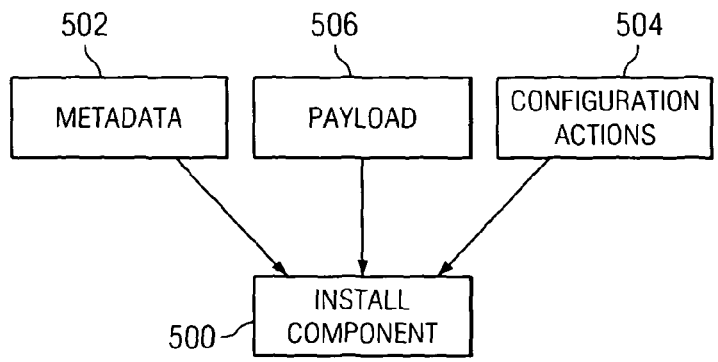
FIG. 5 is a block diagram showing elements of an install component for use in a modular install configuration engine, such as modular install configuration engine 400 in FIG. 4, in accordance with an aspect of the present invention.

FIG. 5 is a block diagram showing elements of an install component 500 for use in a modular install configuration engine, such as modular install configuration engine 400 in FIG. 4, in accordance with an aspect of the present invention. Install component 500 corresponds to one of install components 402 shown in FIG. 4. In an aspect of the present invention, install component 500 has three components, metadata component 502, configuration actions component 504, and payload component 506. In an aspect of the present invention, modular install configuration engine 400 incorporates the instructions provided in metadata component 502 and configuration actions component 504 into instructions of modular install configuration engine 400 to produce a unique custom install program for use on a particular client's data processing system.

Although the illustrative embodiments describe install components 402 and 500 for use with modular install configuration engine 400 shown in FIG. 4, install components 402 and 500 may be used with any suitable modular install engine. Thus, install components 402 and 500 may be considered pluggable installation components for use with any install engine adapted to read install components 402 and 500. Plugging install components 402 and 500 into a suitable install engine may involve incorporating install components 402 and 500 into the install engine. On the other hand, plugging install components 402 and 500 into a suitable install engine may involve merely calling the install components during an installation without incorporating install components 402 and 500 into the install engine. Install components 402 and 500 may be used by an install engine for other purposes, such as to configure previous installations of existing software. Thus, install components 402 and 500 may be adapted for use with a wide variety of install engines in a wide variety of environments.

Payload component 506 contains the actual set of payload files to be deployed on an end system. Each payload file contains instructions for performing a task on the user's data processing system. At a minimum, payload component 506 is one payload file. Payload component 506 may contain all the files necessary to perform a full install of an application or may contain files sufficient to update a previous version of the application.

Metadata component 502 describes the actions to be performed in relation to each one of the files in payload component 506. In an aspect of the present invention, metadata component 502 provides for actions to be performed on each file, such as adding a file, deleting a file, and replacing a file. In the case of adding a file, metadata component 502 contains instructions that the file should be created on or added to the user's end system. In the case of deleting a file, metadata component 502 contains instructions that if the particular payload file already is already present on the user's system, then that file should be deleted. Metadata component 502 may also contain instructions for evaluating whether it is safe to delete the old file. If it is not safe to delete the old file, metadata component 502 includes instructions for not deleting the old file.

In the case of replacing the file, metadata component 502 contains instructions that if the particular payload file is already present on the user's system, then that file should be replaced or overwritten with the current payload file. Again, metadata component 502 may also contain instructions for evaluating whether it is safe to replace the old file. If it not safe to replace the old file, metadata component 502 includes instructions for not replacing the old file.

Metadata component 502 may provide for additional actions to be performed with payload files. For example, the metadata may contain instructions to first delete an old payload file from the users system and then re-install a new or different payload file. Metadata component 502 may also contain instructions to register the installation of a payload file or an install component 500 with the manufacturer. Similarly, metadata component 502 may also contain instructions to modify the registry of the end user's operating system. Thus, metadata component 502 is capable of providing one or more instructions for delivering a payload file, registering a payload file, or performing some other action relating to a payload file or a set of payload files in a payload component.

Configuration actions component 504 carries configuration instructions, such as scripts, that are deployed into a compatible install configuration engine, such as modular install configuration engine 400. Configuration actions component 504 may be designed to operate with other configuration engines. Configuration actions component 504 allows a user to configure the install component 500. Configuration actions component 504 may also contain instructions for automatically configuring a payload file before, during or after installation. Configuration actions component 504 may also contain additional instructions for how modular install configuration engine 400 handles install component 500.

Configuration actions component 504 contains instructions directing modular install configuration engine 400 to take one or more actions. One action modular install configuration engine 400 takes is to identify install component 500. Thus, configuration actions component 504 contains code that allows modular install configuration engine 400 to recognize install components 402, though such code may be inserted anywhere within install components 402. Configuration actions component 504 may contain additional instructions that require modular install configuration engine 400 to take certain actions. For example, configuration actions component 504 contain instructions that require modular install configuration engine 400 to interpret metadata components in a particular order. Configuration actions component 504 may also contain instructions that require modular install configuration engine 400 to prompt a user for input or to search for a file stored elsewhere on the user's system or over a network. Thus, configuration actions component 504 may contain one or more instructions that direct modular install configuration engine 400 to configure a payload file in a predetermined manner before, during or after installation of the payload file.

Figure 6:
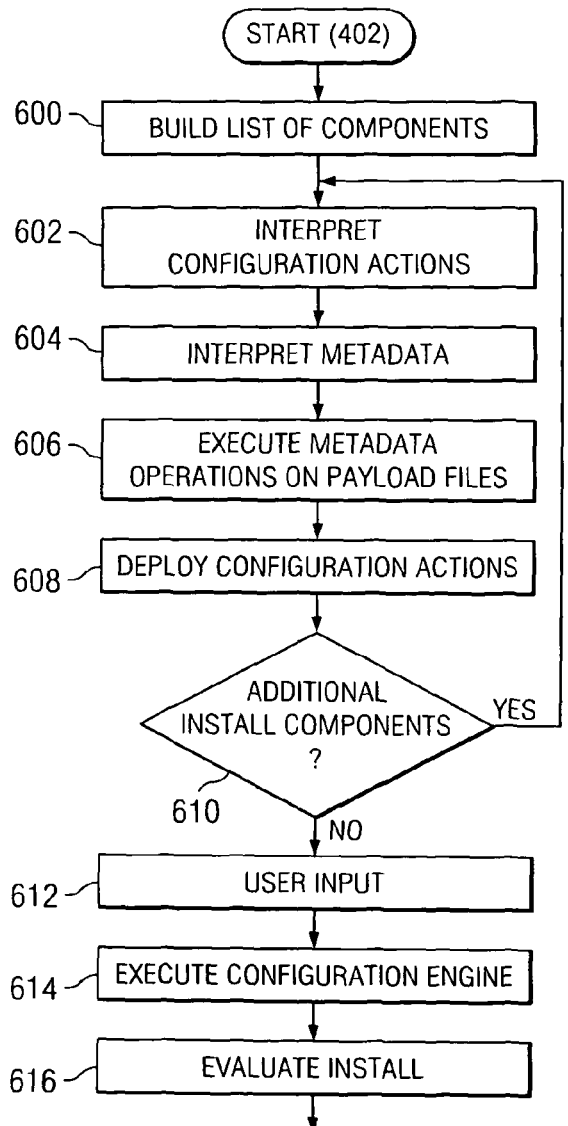
FIG. 6 is a flowchart of the operation of a modular install configuration engine, in accordance with an aspect of the present invention.

FIG. 6 is a flowchart of the operation of the modular install configuration engine, such as modular install configuration engine 400 shown in FIG. 4, in accordance with an aspect of the present invention. Once a user decides which install components to install on the end system computer, the modular install configuration engine begins the installation process.

Although the illustrative embodiments describe modular install configuration engine 400 for use with install components 402 and 500, modular install configuration engine 400 may be used with any suitable pluggable component to install or configure software on one or more target data processing systems. For example, modular install configuration engine 400 may be used during installation of software to read existing pluggable installation components, incorporate the existing pluggable installation components into the engine, and then execute the installation of software onto one or more target data processing system. Modular install configuration engine 400 may be used to update software in a similar manner.

In another example, modular install configuration engine 400 may be used to configure existing software on one or more target data processing systems. In this case, modular install configuration engine 400 reads pluggable configuration components, incorporates the components into modular install configuration engine 400, and then configures software already present on one or more target data processing systems. Continuing the example, in WebSphere Application Server software, modular install configuration engine 400 may be used to create application server profiles. Application server profiles are configuration files. Modular install configuration engine 400 creates the application server profiles by using modular install configuration engine 400 to execute pluggable configuration commands without performing an installation. Thus, modular install configuration engine 400 may be used to configure existing software on one or more target data processing systems without necessarily installing or updating software on the target data processing systems. Nevertheless, modular install configuration engine 400 is capable of installing, updating, and configuring software on one or more target data processing systems and may perform each function simultaneously.

Returning to FIG. 6, the operation of modular install configuration engine 400 begins by building a list of install components, such as install component 402 in FIG. 4 or install component 500 in FIG. 5, that will be used with a particular installation (step 600). The list of install components to be installed is built from a list of all available install components. The instructions that allow install components to be recognized by the modular install configuration engine may be contained in the configuration actions component, such as configuration actions component 504 in FIG. 5, or in some other component of the install components.

Next, the modular install configuration engine optionally interprets configuration actions in configuration actions component (step 602). Some configuration actions may need to be performed before interpreting metadata and executing the metadata operations on the payload files. For example, a user may need to provide early input in order to properly perform the correct actions on the payload files. In this case, the configuration actions component provides the instructions required to query the user, receive user input, and either record the input or execute actions appropriate to the input. Thus, the user input may be incorporated into the modular install configuration engine.

Next, the modular install configuration engine interprets the metadata component of each install component (step 604). The metadata component may be, for example, metadata component 502 in FIG. 5 and the install component may install component 500 in FIG. 5. The modular install configuration engine records what action will be taken on each payload file according to the instructions provided in the metadata component. Subsequently, the modular install configuration engine carries out the instructions coded in the metadata component for each payload file (step 606). However, it is possible that either the metadata component or the configuration actions component specifies the order in which payload files will be delivered.

Subsequently, the modular install configuration engine deploys the configuration actions component of each install component (step 608). In one aspect of the present invention, the modular install configuration engine builds a list of queries for which the user will provide input. The modular install configuration engine or install component is provided with instructions to prompt for user input, receive user input, and either record the user input or execute actions according to user input. The modular install configuration engine may prompt the user for input while integrating each install component (before step 610).

Alternatively, the modular install configuration engine, according to the install component instructions, may prompt the user for input after building all install components into the modular install configuration engine (after step 610). In addition, other configuration actions may be taken, such as to search for additional files on the user's end system or over a network. The additional files may be incorporated into the modular install configuration engine or otherwise used during the install process.

Afterwards, the modular install configuration engine searches for any additional install components (step 610). If additional install components exist, then the modular install configuration engine returns to step 602 and processes the next install component. In different embodiments, the modular install configuration engine may perform steps 602 through 608 on install components in series, in parallel or in a particular order. If no additional install components are present to process (step 610), and if there is remaining user input to pass to the modular install configuration engine, then the remaining user input is provided to the modular install configuration engine (step 612).

Thereafter, all of the configuration actions have been identified and the configuration engine has all of the actions needed from all of the components. Thus, no more install components will be needed to complete the installation.

In an aspect of the present invention, each install component does not affect the other install components used in conjunction with the modular install configuration engine. Thus, each install component is independent of the other install components. Alternatively, an install component may use another install component as a resource or use another install component in some other way. In this case, the two install components are required when plugged-into the modular install configuration engine. In both cases, the modular install configuration engine ensures that no compatibility problems arise as a result of differing instructions in each install component.

Once the user has provided required input and the input has passed to the modular install configuration engine (step 612), the modular install configuration engine is ready to complete an installation. The modular install configuration engine, which now contains the entire set of install components, executes the install onto the user's system (step 614).

During execution, the modular install configuration engine evaluates the success of installing each install component and each payload file (step 616), with the process terminating thereafter. In an aspect of the present invention, the modular install configuration engine obtains the instructions or scripts necessary to make the evaluation from a corresponding install component, though the instructions for performing the evaluation may already be included with the modular install configuration engine. The installation of each payload file is classified as successful, partially successful, or failed. If a payload file is successfully installed, then the modular install configuration engine continues installation of other payload files or install components. If a payload file is partially successfully installed, or fails to install, then the modular install configuration engine uses instructions in the metadata component or the configuration actions component to determine whether to re-try installation of the payload file, to skip installation of the payload file or to discontinue installation of remaining payload files.

Once all payload files have been successfully installed on the user's system, the installation is considered complete and the process ends. The process also ends if the installation fails, whereupon a user can take action to correct the reason for failure and subsequently retry the install process.

The modular install configuration engine need not be completely configured before it begins performing an installation. In this case, the procedures shown in FIG. 6 are slightly modified, as shown by the following exemplary procedure.

First, the modular install configuration engine builds a list of install components that will be used with a particular installation (step 600). The modular install configuration engine then interprets the configuration actions portion of the install component (step 602). Some actions may be taken immediately. For example, the configuration actions component may require that metadata be interpreted in a particular order. In addition, the user may be prompted for input before metadata operations are executed on payload files in the payload component.

The modular install configuration engine then interprets the metadata component of each install component (step 604). The modular install configuration engine performs a corresponding action on each payload file (step 606). Thus, the modular install configuration engine causes each payload file to be added, deleted, replaced or otherwise modified according to the instructions provided in the metadata component.

Subsequently, the modular install configuration engine deploys any additional configuration actions called by the configuration actions component (step 608). For example, the configuration actions component may cause the modular install configuration engine to query a user for additional input or may cause the modular install configuration engine to take some other action.

The modular install configuration engine may perform steps 602, 604, 606, and 608 on each install component in parallel, in series, or in a particular order, depending on the needs of the end user and depending on the instructions provided to the modular install configuration engine or the configuration actions components. After deploying one or more install components, the modular install configuration engine then determines whether there are any remaining install components to deploy (step 610). If more install components need to be deployed, then the modular install configuration engine repeats steps 602 through 608 until all install components have been deployed.

Because the modular install configuration engine in this example already has been executed and the user input already has been determined, steps 612 and 614 are skipped. However, the modular install configuration engine should evaluate the success or failure of each install component (step 616), as described above.

Whatever process is used to install the payload files, the modular install configuration engine prevents the install components from conflicting with each other. Payload files may have the same name, so the modular install configuration engine may require that each install component be placed in a separate directory on the system's storage device. If a conflict exists between one or more actions or payload files, the modular install configuration engine may prevent one or both files from being installed on the user's system. In this case, the modular install configuration engine can notify the user or manufacturer that a conflict exists between instructions. The user or the manufacturer(s) of the install components can then take appropriate action.

FIGS. 7a and 7b show exemplary code for a metadata component, such as metadata component 502 of install component 500 in FIG. 5, in accordance with an aspect of the present invention. The code shown in FIG. 7b flows from the code shown in FIG. 7a and the code shown in FIG. 7c flows from the code shown in FIG. 7b. The metadata component of FIG. 7 describes a set of deployment actions for a WebSphere Application Server component available from International Business Machines Corporation.

FIG. 8 shows exemplary code in Java for a configuration actions component, such as configuration actions component 504 of install component 500 in FIG. 5, in accordance with an aspect of the present invention.

FIGS. 9a through 9h show exemplary code for a configuration actions component, such as configuration actions component 504 of install component 500 in FIG. 5, in accordance with an aspect of the present invention.

In summary, the present invention provides for a modular install configuration engine and one or more accompanying install components. In use, the modular install configuration engine draws upon instructions provided with individual install components to deliver payload files contained within the install components. Each install component may be programmed by different vendors and the different vendors need not communicate with each other, so long as each install component is designed to work in conjunction with the modular install configuration engine. The modular install configuration engine may allow the installation of the install components and payload files within the install components according to a prioritized order.

For example, a user chooses to use the modular install configuration engine in conjunction with a first install component having a first payload file and a second install component having a second payload file. Metadata in the first install component specifies that the first payload file should be installed prior to other payload files. Metadata in the second install component specifies that the second payload file may be installed after other payload files. In this case, the modular install configuration engine ensures that the first payload file is installed before the second payload file.

In another example, both metadata instructions provide that the first and second payload files should be installed first. In this case, the modular install configuration engine is adapted to select which payload file should be installed first and then subsequently install the payload files in the selected order.

Similarly, the modular install configuration engine ensures that the configuration actions component of each install component may be performed according to a prioritized order. As with the metadata instructions example above, the execution priority for configuration actions may be controlled. More generally, the modular install configuration engine is adapted to govern the interrelationship between the configuration action components of each install component. Thus, an install component may rely on user input prompted by the configuration actions component of another install component. In this case, both install components must be used and the modular install configuration engine controls the relationship between the configuration actions component of each install component.

As can be seen from the above description, the install components may be described as pluggable install components. Thus, a user builds a unique install software package by plugging a number of install components into the modular install configuration engine. The install components plug into the modular install configuration engine and, in turn, the engine incorporates each install component to build a unique software package for installing another application.

In addition, the modular install configuration engine may be used to uninstall configured files. During or before installation, the associated set of metadata are stored on the data processing system upon which the files are installed, or upon some other data processing system. The modular install configuration engine then reads the associated set of metadata and any modifications made to the associated set of metadata during installation. Thereafter, the modular install configuration engine uninstalls the configured files based on the stored set of associated metadata. In this way, the modular install configuration engine may be used to perform a transformation from an installable software image to an installed software image and visa versa.

The modular install configuration engine and accompanying install components described herein provide several advantages over prior install engines. The modular install configuration engine allows the dynamic and prioritized installation of the install components, instead of using only proscribed action lists. In addition, the modular install configuration engine and accompanying install components allow for an efficient and pluggable dynamic means to transfer user input into the modular install configuration engine, wherein the user input queries are created by a number of different programs. Thus, the modular install configuration engine can create a fully integrated, unique install program for each customer based on code written by programmers that never communicate with each other.

The present invention allows the install components to be built independently of the modular install configuration engine. Accordingly, many different programmers, including independent software vendors (ISVs), can contribute to how the modular install configuration engine installs payload files in addition to contributing to the payload files themselves. In addition, each ISV or programmer is able to create updates for their own component, meaning that only groups intimately familiar with their own install components need to do the work of updating older components. The modular install configuration engine is run again when one or more updates are ready to be installed into a previous install, with the resulting install program specifically tailored to a particular update process. Because multiple programming groups can easily plug the install components into the modular install configuration engine, the work of creating, installing, and updating complex software can be performed much more quickly, much more efficiently, and with much higher quality. Prior art install engines are incapable of these functions.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, within a computer hardware device, of installing a file onto the computer hardware device using a modular install configuration engine, comprising:

receiving a pluggable install component, said install component including a payload component containing a file to be installed onto the computer hardware device, a metadata component containing metadata instructions for how the file should be installed, and a configuration actions component containing configuration instructions for configuring the file;

providing a modular install configuration engine, said modular install configuration engine being compatible with the pluggable install component and being adapted to install the file onto the computer hardware device by plugging the install component into the modular install configuration engine;

interpreting the metadata of the install component using the modular install configuration engine;

carrying out the metadata instructions on the file using the modular install configuration engine;

carrying out the configuration instructions for configuring the file using the modular install configuration engine;

installing the file onto the computer hardware device using the modular install configuration engine; and carrying out other configuration instructions from the configuration actions component before the metadata is interpreted.

2. The method of claim 1 wherein
the carrying out the other configuration instructions comprises
prompting a user for input,
receiving the input, and
incorporating the input into carrying out the configuration instructions.

3. The method of claim 1 wherein
the interpreting, the carrying out the metadata instructions, and the carrying out the configuration instructions are all performed before the installing the file onto the computer hardware device.

4. The method of claim 1 wherein
the carrying out the metadata instructions comprises carrying out an action selected from the group consisting of
adding the file to the data processing system,
deleting the file if the file is already present on the computer hardware device, and
replacing the file if the file is already present on the computer hardware device.

5. A data processing system comprising:
a bus;
a memory operably connected to the bus;
a processor unit operably connected to the bus, the processor unit being configured to:
receive a pluggable install component, the pluggable install component including a payload component containing a file to be installed onto the data processing system, a metadata component containing instructions for how the file should be installed, and a configuration actions component containing instructions for configuring the file;
provide a modular install configuration engine, the modular install configuration engine being compatible with the pluggable install component and being adapted to install the file onto the data processing system by plugging the pluggable install component into the modular install configuration engine;
interpret the metadata component of the install component;
carry out the metadata instructions of the install component;
deploy the configuration actions component of the install component such that the file of the install component may be configured;
and
install the file of the install component onto the data processing system,
wherein
other configuration actions from the configuration actions component are performed before the metadata component is interpreted.

6. The data processing system of claim 5 wherein the processor unit is further
configured to prompt a user for input, receiving user input and incorporate the user input into carrying out the configuration instructions.

7. The data processing system of claim 5 wherein the processor unit is further
configured to build a unique install program before carrying out the installation.

8. A computer program product comprising a computer readable storage medium having stored therein computer readable program code for installing at least one file onto a computer hardware device, the computer readable program code, which when executed by the computer hardware device, causes the computer hardware device to perform operations of
receiving a pluggable install component, said install component including a payload component containing a file to be installed onto the computer hardware device, a metadata component containing metadata instructions for how the file should be installed, and a configuration actions component containing configuration instructions for configuring the file;
providing a modular install configuration engine, said modular install configuration engine being compatible with the pluggable install component and being adapted to install the file onto the computer hardware device by plugging the install component into the modular install configuration engine;
interpreting the metadata of the install component using the modular install configuration engine;
carrying out the metadata instructions on the file using the modular install configuration engine;
carrying out the configuration instructions for configuring the file using the modular install configuration engine;
installing the file onto the computer hardware device using the modular install configuration engine; and
carrying out other configuration instructions from the configuration actions component before the metadata is interpreted.

* * * * *